US007793697B2

(12) United States Patent
Weber et al.

(10) Patent No.: US 7,793,697 B2
(45) Date of Patent: Sep. 14, 2010

(54) FILM TRANSFER APPARATUS WITH VARIABLE FILM WEB GUIDANCE

(75) Inventors: Alexander Weber, Weinheim (DE); Andreas Krispin, Mühlheim (DE); Joachim Sonnenschein, Mühltal (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 853 days.

(21) Appl. No.: 11/713,821

(22) Filed: Mar. 2, 2007

(65) Prior Publication Data

US 2007/0215288 A1 Sep. 20, 2007

(30) Foreign Application Priority Data

Mar. 2, 2006 (DE) ....................... 10 2006 009 633

(51) Int. Cl.

| | |
|---|---|
| ***B28B 19/00*** | (2006.01) |
| ***B29C 65/48*** | (2006.01) |
| ***B32B 37/00*** | (2006.01) |
| ***B65H 37/00*** | (2006.01) |
| ***B31F 5/00*** | (2006.01) |
| ***B05C 11/00*** | (2006.01) |
| ***B05C 1/00*** | (2006.01) |

(52) U.S. Cl. ....................... 156/384; 156/390; 156/537; 156/540; 156/552; 156/582; 118/46; 118/212; 118/224

(58) Field of Classification Search ................. 156/230, 156/233, 235, 238–241, 244.16, 289, 291, 156/384, 390, 537, 538, 540, 552, 553, 578, 156/580, 582; 118/46, 242, 224, 256, 258
See application file for complete search history.

(56) References Cited

U.S. PATENT DOCUMENTS

| | | | | |
|---|---|---|---|---|
| 5,532,722 | A | 7/1996 | Namiki et al. | |
| 5,565,054 | A | 10/1996 | Lappe et al. | |
| 2007/0212490 | A1 * | 9/2007 | Preisner et al. | 427/288 |

FOREIGN PATENT DOCUMENTS

| | | | |
|---|---|---|---|
| DE | 694 01 669 | T2 | 5/1997 |
| EP | 0 578 706 | B1 | 11/1994 |
| WO | WO 2005/100028 | A1 | 10/2005 |
| WO | WO 2005100035 | A2 * | 10/2005 |

* cited by examiner

*Primary Examiner*—Philip C Tucker
*Assistant Examiner*—Sing P Chan
(74) *Attorney, Agent, or Firm*—Laurence A. Greenberg; Werner H. Stemer; Ralph E. Locher

(57) ABSTRACT

An apparatus for film transfer includes at least one printing press and at least one transfer film supply roller, a transfer film guiding device for guiding the transfer film web from the transfer film supply roller to a transfer nip. In order to ensure a variable film transfer in different printing units of the printing press, up to now the transfer film supply roller is moved with a film module into the region of the desired printing unit. In order to make a variable film transfer possible without complicated moving, the guiding device has web guiding elements at least in the region of the at least one printing press and the web guiding elements are enabled to selectively guide the transfer film web to different positions on the at least one printing press.

17 Claims, 6 Drawing Sheets

FILM TRANSFER APPARATUS WITH VARIABLE FILM WEB GUIDANCE

CROSS-REFERENCE TO RELATED APPLICATION

This application claims the priority, under 35 U.S.C. §119, of German application DE 10 2006 009 633.9, filed Mar. 2, 2006; the prior application is herewith incorporated by reference in its entirety.

BACKGROUND OF THE INVENTION

Field of the Invention

The present invention relates to an apparatus for transferring a transfer layer from a carrier film, which together form a transfer film, onto a printing material. The apparatus comprises at least one printing press for printing images on the printing material, at least one film module having at least one transfer film supply roller for storing and unwinding at least one transfer film web, and a transfer film guiding device at least for guiding the transfer film web from the transfer film supply roller to a transfer nip along a film transport path. The transfer nip is formed by an impression cylinder and a film transfer cylinder in order to transfer the transfer layer onto the printing material, for which purpose the printing material is guided through the transfer nip along a printing material transport path. The apparatus further has a transfer film collecting roller for winding up the transfer film web which has been guided through the transfer nip.

The apparatus preferably relates to the process of so-called cold film embossing.

In cold film embossing, a transfer layer is transferred from a carrier material onto a printing material.

A carrier film is used as carrier material. A varnish layer which is responsible, in particular, for the coloration of the transfer layer is applied to this carrier film. An aluminum layer which causes the metallic gloss of the transfer layer is joined to the varnish layer. Furthermore, a further adhesion layer which improves the adhesion properties of the transfer layer with the adhesive on the printing material can be provided on the aluminum layer. The layers which are transferred from the carrier material are called transfer layer.

In order to transfer the transfer layer onto a printing material, the transfer film is guided together with the printing material through a transfer nip. The transfer nip is formed by a transfer cylinder and an impression cylinder which bear against one another. The transfer cylinder and the impression cylinder are set against one another with a force in a rotating manner, so that the transfer layer is transferred onto the printing material in the transfer nip.

In order that the transfer layer can be transferred onto the printing material in regions, the printing material is provided, before the film transfer, with an adhesive layer which corresponds to the region, wherein film is transferred.

A colorless adhesive, an adhesive with a defined inherent color, or else an adhesive which is colored in accordance with the film can be used as the adhesive. It has been known from bronzing technology to use a particularly tacky ink for the transfer of metal particles, the coloration of which tacky ink corresponds to the desired metalization. To this extent, a tacky ink can also naturally be used as an alternative to a colored adhesive.

The transfer layer can be substantially a metal layer or else other layers. For example, an aluminum layer can be provided which, depending on requirements, is applied to a yellow/golden varnish layer or a silver-colored varnish layer.

Furthermore, a colorless layer can also be used as transfer layer, for example from PE film which is transferred onto the printing material in such a way that it forms a protective layer there.

The use of a conductive layer as transfer layer is also possible; as a result of this, electrically and/or thermally conductive regions can be transferred onto the printing material. The transfer of prepared delimited layer regions as transfer layer is also possible; here, this can be, for example, RFID chips or their antennas. Suitable ceramics can also be transferred. In this way, it is conceivable for it to be possible for also superconductive structures to be transferred onto a printing material.

An apparatus of the generic type for cold film embossing is proposed in European patent EP 0 578 706 B1 and its corresponding U.S. Pat. Nos. 5,735,994 and 5,565,054.

There, the cold film embossing takes place within a multicolor printing press. The printing material is transported along a predefined transport path in the printing press. The printing material can be, for example, paper sheets, paperboard or else rolls.

In a first printing unit of the printing press, an adhesive is transferred onto the printing material instead of an ink. For the application of the adhesive in regions, a printing plate which has been set with corresponding images is clamped in this printing unit and the adhesive is transferred onto the printing material like a conventional offset printing ink.

The printing material is then transported further into a second printing unit. In this second printing unit, the impression cylinder and the blanket cylinder are configured as a transfer unit.

A film module having a transfer film supply roller and a transfer film collecting roller is situated in the region of this second printing unit. The film is guided from the transfer film supply roller to the transfer nip and further to the transfer film collecting roller via intermediate rollers of a film guiding device.

In order to transfer the transfer layer onto the printing material, the transfer film and the printing material having the adhesive layer in regions are guided together through the transfer nip in such a way that the transfer layer rests on the adhesive layer. The transfer layer is then transferred onto the printing material in the transfer nip by way of pressure. Here, the transfer layer is removed cleanly from the transfer film as a result of the adhesive.

For a clean transfer of the transfer layer onto the printing material, the film and the printing material are driven at the same speed in the region of the transfer nip during the transfer.

In the apparatus which is shown there, the film module is assigned exactly to the printing unit, wherein a film transfer is to be provided.

If then, for example in a first print job, first of all ink layers are to be applied in first printing units and subsequently a protective layer or a metal layer is to be transferred from a transfer film onto the printing material, the printing unit for the adhesive application is then situated behind the ink-applying printing units together with the subsequent printing unit which is configured as a transfer unit.

If a metal layer is then to be transferred in a second print job before the application of inks onto the printing material, it is necessary that the complete film module with supply roller, collecting roller, and film guiding means is removed from the printing unit and is placed onto a printing unit which is positioned in front of the other printing units. A further printing unit for the adhesive application then has to be provided before that printing unit. Flexible setting up of the apparatus, with the result that a film transfer is made possible at different positions, is not possible there.

SUMMARY OF THE INVENTION

It is accordingly an object of the invention to provide a foil transfer device with variable foil path guidance which overcomes the above-mentioned disadvantages of the heretofore-known devices and methods of this general type.

With the foregoing and other objects in view there is provided, in accordance with the invention, an apparatus for transferring a transfer layer onto a printing material, the apparatus comprising:

a printing press for printing images on the printing material, wherein the printing material is guided along a printing material transport path through the printing press and through a transfer nip formed between an impression cylinder a film transfer cylinder;

a film module having at least one transfer film supply roller for storing and unwinding therefrom at least one transfer film web with a carrier film and a transfer layer;

a transfer film guiding device for guiding the transfer film web from the transfer film supply roller to the transfer nip along a film transport path, the transfer nip being configured to transfer the transfer layer onto the printing material as the printing material is guided through the transfer nip along the printing material transport path; and the guiding device including web guiding elements disposed in a region of the printing press, the web guiding elements being configured for selectively guiding the transfer film web to different positions in the printing press.

The transfer film web is guided by web guiding elements which are assigned to the film guiding device. These web guiding elements assist at least the guidance of the film web along the film transport path from the transfer film supply roller of a film module to a transfer nip. Here, the transfer nip can be formed by all suitable cylinders in the at least one printing press. For this purpose, for example, a blanket cylinder and an impression cylinder, a film transfer cylinder which is thrown on additionally and the impression cylinder, can be provided, or, in one advantageous embodiment, a sheet transfer cylinder and a film transfer cylinder which is thrown onto the latter can also be provided for this purpose.

According to the invention, the web guiding elements are provided in the region of the at least one printing press in such a way that they are suitable for guiding the transfer film web to at least two positions which differ from one another, that is to say optionally to a first or to a second position.

Simple and flexible changeover of the printing press for different jobs can be ensured in this way. The film module can be provided at one location and left there, independently of the location which is required according to the job for the film transfer. Flexible web guidance is made possible for the transfer film web solely by the web guiding elements which are provided. Depending on requirements, the film can be guided to at least two positions which are different from one another by the web guiding elements. These positions can be, for example, possible transfer nips in the printing press. Depending on requirements, the film can then be guided either to a first transfer nip or a second transfer nip. In the case of two different film webs, there can also be provision for them to be guided from one or from two different film modules to two different positions in the region of the printing press. As can be seen, very flexible web guidance is advantageously possible as a result for the film web to different positions on the at least one printing press, without complex repositioning of the film module or the film modules being necessary. It is sufficient to set the film up with regard to the web guiding elements which have already been provided, in order to achieve this flexibility. Here, the film module itself does not have to be assigned directly to a printing unit.

In accordance with one advantageous embodiment, the web guiding elements are positioned in the region of the at least one printing press, with the result that they can guide the transfer film web from the film module to at least two positions on the printing press which differ from one another. Here, the film module can be provided in a fixed manner in the region of a printing press, and the transfer film can advantageously be guided by means of the web guiding elements to at least two different positions on this printing press.

In accordance with an added feature of the invention, the at least one film module is provided in a machine room of a print shop which contains at least two printing presses in the machine floor. However, more printing presses and more film modules can also be provided.

According to the invention, the web guiding elements are to be positioned in such a way that the transfer film web can be guided to at least two positions which differ from one another on at least two different printing presses.

In this way, only a small number, and at least one film module, is required favorably and can carry out a film transfer on different printing presses. The positioning of the web guiding elements can make it possible that cold film embossing or another film transfer can take place sequentially in two different printing presses. For this purpose, only the guidance of the film over the corresponding web guiding elements then has to be set up.

If a plurality of film modules are used, a film transfer can take place at different times on different printing presses and/or at the same time at different positions of the printing presses. There is very great flexibility with regard to the selection and number of printing presses and/or transfer positions for the film transfer. Instead of the printing presses, any other sheet-processing machines can also be provided which comprise cylinders or rolls which can form a transfer nip for transferring the transfer layer from the transfer film onto the printing material.

There is provision in one development of the invention for the at least one film module to be provided on a processing station of the at least one printing press. Here, this can be, for example, a feeder, a delivery, a turning device, a printing unit, a varnishing unit, a punching unit, an embossing unit or a further processing unit of the printing press. Other processing stations are of course also conceivable, on which a film module can be provided. A low installation space requirement for the film module can be achieved by the positioning on a processing station of this type.

There is provision in one embodiment according to the invention for the web guiding elements to comprise deflection elements for deflecting the film web from a first movement plane which extends substantially parallel to the transport path of the printing material in the direction of the transfer nip for the transfer of the transfer layer onto the printing material.

In this way, the film web can be guided substantially parallel to the printing material over large distances. This can preferably take place above the machine, with the result that the film web presents no danger for the operating personnel. The film is not deflected and fed to the transfer nip until it is in the vicinity of the position on the printing press, where a film transfer is to take place. This deflection can preferably take place in such a way that the film is deflected from a substantially horizontal movement plane into a substantially vertical movement plane.

Here, these deflection elements are arranged or positioned in such a way that a film web which runs above the printing press can be directed down to any possible transfer nip. If, for example, a potential transfer nip can thus be provided in every printing unit and/or varnishing unit and/or processing unit, then the deflection elements are provided above the units in such a way that only one suitable deflection element need be selected by a user and the film web can then accordingly be set up in such a way that it is guided via this deflection element. As every unit is assigned a deflection element in this way, the apparatus can be set up flexibly for cold film embossing or film transfer.

There is provision in one advantageous embodiment for the film module to be provided such that it is installed in an immovably fixed position. An ordered operating sequence with maximum safety is possible as a result.

There is provision in one embodiment for the film module to comprise a transfer film collecting roller for winding up a film web which has been guided through the transfer nip. The space requirements can be minimized in this way.

There is provision in one alternative embodiment for a transfer film collecting roller to be provided at a location which differs from the position of the film module in the region of the at least one printing press. There is provision in one preferred embodiment for, as viewed in the transport direction of the printing material which is printed in the printing press, the transfer film collecting roller to follow the film module. Furthermore, there can favorably be provision for a turning device of the printing press to lie between the film module and the transfer film collecting roller.

The guidance of the film can be adjusted to the desired position for the film transfer in a simpler manner as a result of this structural separation of the film module and the transfer film collecting roller. The guiding elements for guiding the film to and away from the transfer nip are separated spatially to a very great extent and are more readily accessible. This not only makes setting up of the printing press for film embossing easier, but maintenance work can also be carried out more easily.

There is provision in one advantageous development of the invention for the web guiding device to have web guiding elements which are positioned in such a way that the transfer film web can be guided from at least two different positions on the at least one printing press to the transfer film collecting roller. As has already been described in the above text, the printing press can be set up more flexibly as a result, with regard to in-line finishing of the printing material by film embossing, preferably cold film embossing.

As an alternative, there is provision for the web guiding elements to be positioned in the region of at least two printing presses in such a way that the transfer film web can be guided from at least two printing presses to the transfer film collecting roller. As has already been described for the film module, a plurality of sheet-processing machines, preferably printing presses, which are situated in the same printing room can be supplied in this way with film and the film can also be removed again by means of at least one common film module and at least one common transfer film collecting roller.

There is provision in one particularly advantageous embodiment for the positions, to which transfer film is guided and from which the transfer film is guided away again, to be locations on the printing presses or the printing press which possible potential transfer nips correspond to. That is to say, there are in each case rolls or cylinders here which can be thrown onto one another and can ensure the transfer of the transfer layer onto the printing material. Here, these rolls or cylinders can be rolls or cylinders which are in each case already present in the printing press or are provided additionally for this purpose or another purpose.

In particular, sheet-shaped printing material such as paper, paperboard, films, corrugated paperboard or the like can be suitable as printing material.

Other features which are considered as characteristic for the invention are set forth in the appended claims.

Although the invention is illustrated and described herein as embodied in film transfer apparatus having a variable film web guiding means, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
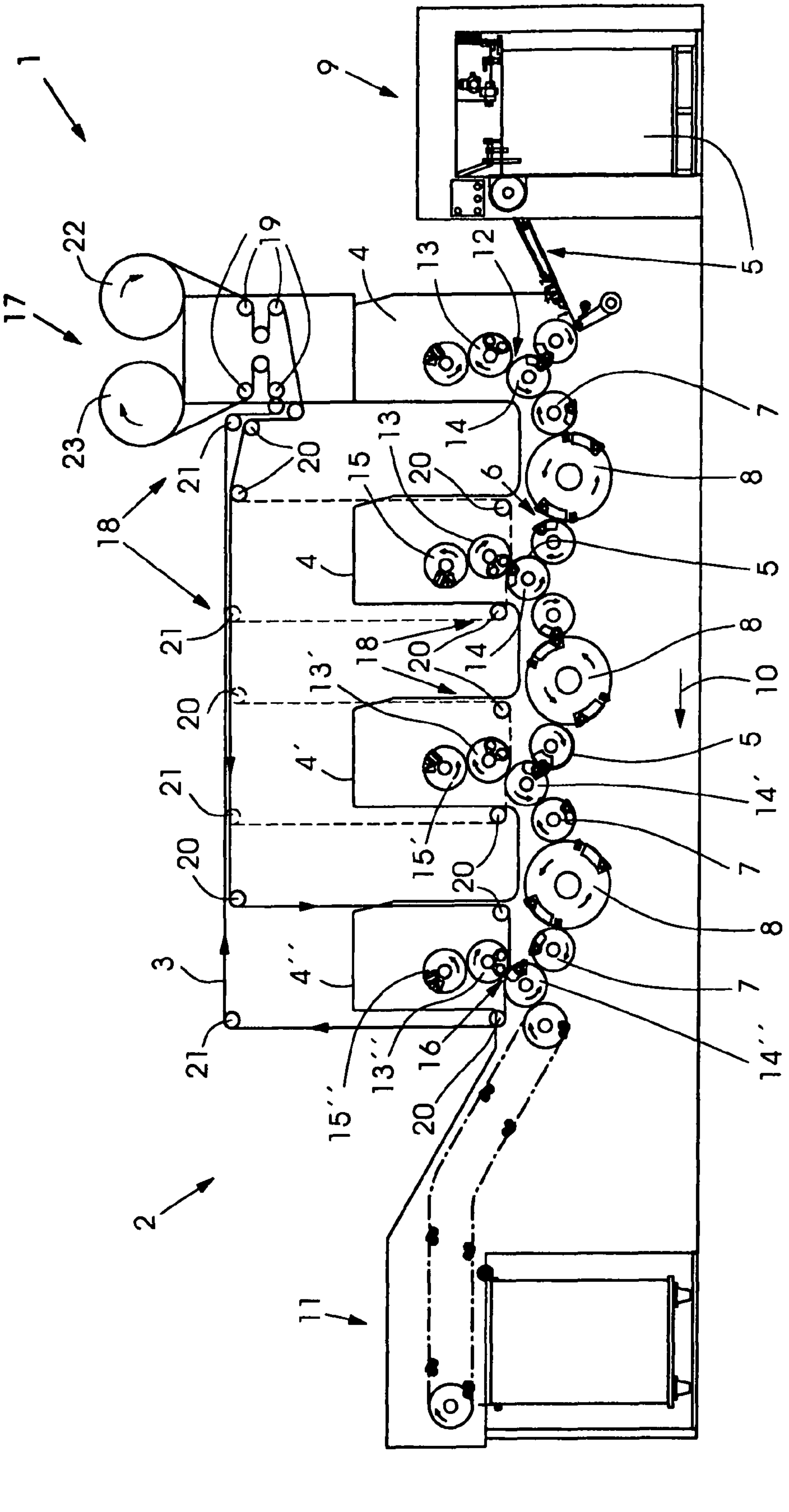
FIG. 1 is a diagrammatic side elevation showing a printing press with variable transfer film guidance according to the invention.

Referring now to the figures of the drawing in detail and first, particularly, to FIG. 1 thereof, there is shown an apparatus 1 for transferring a transfer layer from a carrier film onto a printing material 5 in a printing press 2. The transfer layer forms, together with the carrier film, a transfer film which is provided as transfer film web 3.

The printing press 2 has a plurality of printing units 4, 4', 4". In general, the printing units 4, 4', 4" which are shown here can also be other processing or further processing units in the printing press 2. For example, they can also be varnishing units or embossing units here. The printing units 4, 4', 4" can print a printing material 5 with different colors. The printing press 2 which is shown here is a four-color printing press. They can also be printing presses 2 having one or more printing units 4; printing presses 2 having seven or more printing units 4 are also conceivable; the printing press 2 can also have varnishing units and/or other further processing stations or units in addition or as an alternative.

The printing material 5 is guided through the printing press 2 along a sheet transport path 6. To this end, the printing press 2 has a plurality of sheet transfer cylinders 7 and transfer drums 8. In the case which is shown here, the printing material 5 is a sheet 5 made from paper. The sheet 5 is transported within the printing press 2 from a feeder 9 in the transport direction 10 (shown here by the arrow 10) along its transport path 6 to the delivery 11.

In the printing units 4, ink is transferred onto the printing material. For this purpose, the sheet 5 is guided through a press nip 12 which is formed by an impression cylinder 14 and a blanket cylinder 13. In the press nip 12, the ink is transferred from the blanket cylinder 13 onto the sheet 5. Furthermore, the printing unit 4 has a plate cylinder 15. The printing plate which is clamped on the plate cylinder 15 is inked by way of inking and dampening solution units which are not shown here, with the result that there is ink only on image-providing regions of the printing plate. This ink is transferred onto the printing material 5 via the blanket cylinder 13. A printing blanket or rubber blanket is clamped onto the blanket cylinder 13 for this process. This rubber or printing blanket can be exchanged. A very wide variety of printing blankets are known in the prior art. In general, the requirements of the printing blanket are that it should be able to take up ink satisfactorily, and that this ink is transmitted onto the printing material without residue as far as possible.

In order to transfer the transfer layer from the transfer film 3, the printing material 5 is guided through an application unit 4', moreover. This application unit 4' is a further printing unit 4' of the printing press 2. A printing plate is clamped on the plate cylinder 15' of the printing unit 4', which printing plate has images set on it in such a way that the printing plate can be inked with adhesive in those regions, wherein the transfer layer is to be transferred onto the sheet 5. The adhesive is transferred onto the plate cylinder 15' by means of the inking or dampening solution unit (not shown) and from there onto the blanket cylinder 13' and subsequently onto the sheet 5.

The blanket cylinder 13' and the impression cylinder 14' of the printing unit 4' are conventional cylinders of the printing press 2. The printing blanket, that is to say the cover of the blanket cylinder 13', can naturally be selected from the large number of printing blankets on offer.

An adhesive ink or a tacky ink can be used as adhesive. An adhesive ink is an adhesive which is provided for use in a printing unit 4. It has been known for decades from bronzing processes to use particularly tacky inks, in order to make metalizations adhere to the printing material. These inks have substantially the same effect as a colored adhesive which can likewise be used here.

The sheet 5 which is loaded with adhesive at least partially in the application unit 4' is subsequently guided into the following printing unit 4". The film transfer takes place in this printing unit 4".

In this printing unit 4", a transfer nip 16 is formed by a blanket cylinder 13" which is used as transfer cylinder and the impression cylinder 14". If no film transfer is carried out in the printing press 2, this nip is also a press nip 12 and can be used for the transfer of ink; it is a conventional press nip 12.

The transfer film web 3 is also guided through this transfer nip 16 together with the sheet 5. By way of pressure and with the assistance of the adhesive, the transfer layer of the transfer film is transferred onto the sheet in regions, where the sheet has been loaded with adhesive.

The transfer film web 3 is guided, for transferring the transfer layer onto the sheet 5, from a film module 17 to the transfer nip 16 by means of a film guiding device 18 along a film transport path.

For this purpose, the film guiding device 18 comprises various web guiding elements 19, 20 and 21. Not all the web guiding elements have been labeled for the sake of improved clarity.

Tensioning rollers 19 which ensure uniform tautening of the transfer film web 3 are provided in the film module 17. Economy switching devices can also be provided here which ensure during the economy switching that transfer film is transported through the transfer nip 16 substantially only when the transfer layer is to be transferred. Economy switches of this type are known sufficiently from the prior art. A corresponding illustration has been dispensed with for the sake of improved clarity.

The transfer film web 3 is rolled off from a transfer film supply roller 22 which is provided here in the upper region of the film module 17; this can take place, for example, actively, but passive unrolling, wherein the transfer film web 3 is pulled from the transfer film supply roller 22, is also conceivable.

The transfer film web 3 is guided through by the tensioning rollers 19 and is fed to the printing unit 4" with the transfer nip 16 by deflection rollers 20.

A plurality of deflection rollers 20 are situated at different positions in the region of the film transport path. By corresponding setting up of the printing press 2, the transfer film web 3 can optionally be guided to different positions of the printing press 2 via corresponding deflection rollers 20.

In the example which is shown here, deflection rollers 20 are situated in a region of the film transfer path which extends substantially horizontally and therefore substantially parallel to the sheet transport path 6. Depending on the desired transfer nip 16 of a printing unit 4", the transfer film web 3 is then deflected from the horizontal via a deflection roller 20 which is situated approximately above the printing unit 4". A further deflection roller 20 which guides the transfer film web 3 in the direction of the transfer nip 16 is then positioned in the region of the transfer nip 16. The transfer film web 3 is guided through the transfer nip 16 and is directed via a further deflection roller 20 again substantially perpendicularly upward into a region above the printing press 2. The two deflection rollers 20 in the region of the transfer nip 16 serve here for stability and for achieving as parallel as possible a passage of the sheet 5 and the transfer film web 3 through the transfer nip 16. It is of course also possible to dispense with these deflection rollers 20 in the region of the transfer nip 16; the transfer cylinder, that is to say the blanket cylinder 13" in this case, then serves as a further sheet guiding element which guides the transfer film web 3 through the transfer nip 16.

The deflection rollers 20 are provided above the printing units 4 of the printing press 2 in the region of the different printing units 4. In addition, further deflection rollers 20 are situated in the region of the different press nips 12. As a result, the web guidance of the transfer film web 3 can be set up in a variable manner to various press nips 12.

This possible feeding of the transfer film web 3 can naturally also be extended to further positions on the printing press 2, for example to other processing units of the printing press 2. In principle, each pair of rollers which forms a common nip forms a potential transfer nip 16. There can therefore be provision for deflection rollers 20 to be provided in the region of the film transport path and in the region of a selection of potential transfer nips 16 or in the region of all transfer nips 16, in order to make setting up of the printing press 2 possible in such a way that a film transfer can take place in each of these potential transfer nips 16. As a further condition for a potential transfer nip, it must only be ensured that a printing material 5 can also be guided together with the transfer film web 3 through this potential transfer nip 16.

As viewed in the advancing direction of the transfer film web 3, further deflection rollers 21 are provided behind the transfer nip 16, in order to deflect the transfer film web 3 again into a plane which lies substantially parallel to the sheet transport path. Here, like the deflection rollers 20, the deflection rollers 21 are also assigned to the printing units 4, 4', 4" or different potential transfer nips 16, in order to make it possible, in a printing press 2 which is set up accordingly, to guide the transfer film web 3 from a selected transfer nip 16 to a transfer film collecting roller 23. In the construction which is shown here, the transfer film collecting roller 23 forms one functional unit together with the film module 17. The transfer film web 3 can also be guided in the region of the transfer film collecting roller 23 over tensioning rollers 19 or an economy switching device (not shown here).

Overall, variable transfer film guidance to different positions on the printing press 2 is made possible by the provision of deflection rollers 20 and 21. Here, the different positions are preferably potential transfer nips 16 which are formed, for example, by press nips 12. Other cylinder pairings are also conceivable here, however, as transfer nips 16.

In the printing press 2 which is shown here, the film module 17 is situated on the first printing unit 4 which follows the feeder 9. As this printing unit 4 has only one press nip 12 in this case, this press nip 12 cannot serve as a transfer nip 16, as it would then be missing on an application unit for the adhesive. Therefore, in this case, no deflection rollers 20, 21 which can guide the film into the press nip 12 are shown either. However, it is also conceivable that an application device for the adhesive which lies in front of the transfer nip 12 is provided in this printing unit 4. The adhesive could then be transferred onto a sheet from the feeder 9 by way of this application device (not shown here), and a film transfer could also take place in the same printing unit 4. For this case, the first printing unit 4 which follows the feeder 9 would then also be a printing unit 4 with a potential transfer nip 16, and deflection rollers 20 can then be provided accordingly, in order to make guidance of the transfer film web 3 possible to this potential transfer nip 16.

Figure 2:
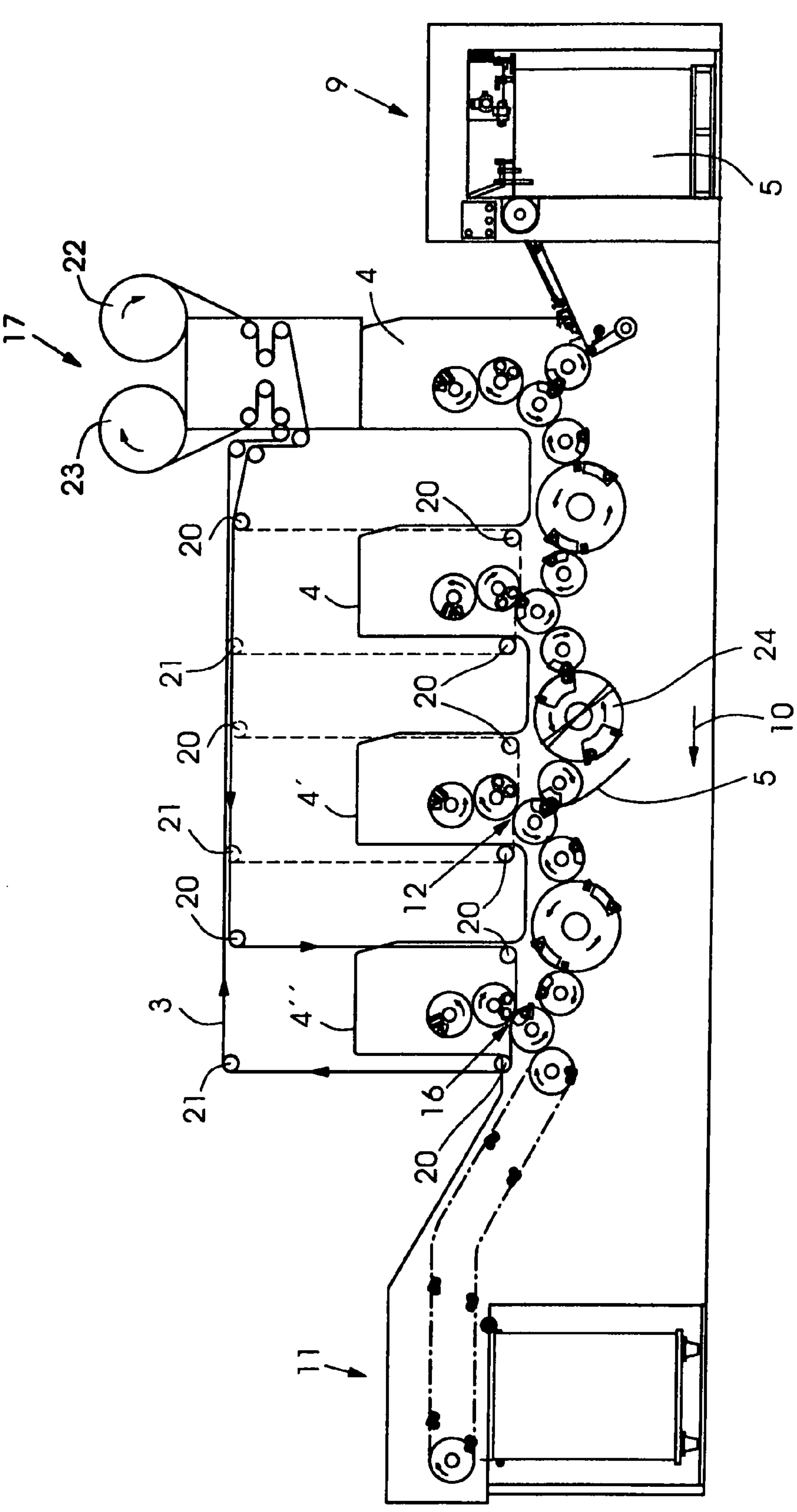
FIG. 2 is a similar view of a variable transfer film guiding apparatus in a printing press with reversing means.

FIG. 2 shows one alternative construction of the transfer apparatus 1. This is substantially a similar construction to that which is shown in FIG. 1. Identical elements are labeled by identical designations.

Different positions on the printing press 2 can be selected for film transfer by way of the different deflection rollers 20, 21. In particular, the transfer film supply roller 22 can be provided with the film module 17 at the start of the sheet transport path.

The printing press 2 which is shown here comprises a turning cylinder 24, as a result of which it becomes possible to print the sheets 5 in recto and verso printing.

The printing press 2 which is shown here is, only by way of example, a printing press having two printing units 4 in front of and behind the turning cylinder 24, as, for example, a printing press 2 having eight printing units 4 (four in front of and four behind the turning means) would be more difficult to illustrate.

The film module 17 is situated on the first printing unit 4, in the same way as shown in FIG. 1. The transfer film web 3 can be guided to the individual potential transfer nips 16 via the deflection rollers 20, 21. The individual potential transfer nips 16 are formed by the press nips 12 of the printing units 4.

The film transfer can take place, for example, on the last printing unit 4 of the printing press 2, as shown here. In particular, this printing unit 4 is then positioned behind the turning cylinder 24.

A conventional print job can therefore take place on a sheet 5 in the printing units 4 in front of the turning cylinder. In the case which is shown here, this would be a two-color print. A conventional four-color print can take place in a printing press 2 having four printing units 4 in front of the turning cylinder 24, before the sheets are turned.

On the reverse side of the sheet 5, the sheet can be coated with the transfer layer. For this purpose, the turning cylinder 24 is followed first of all by a printing unit 4' which operates as an application unit and then by the printing unit 4", wherein the film transfer takes place. Therefore, for a greeting card, first of all one side of the card can be printed conventionally and a metal layer can be applied subsequently to the other side. This layer can either be transferred in regions or lamination over the full surface area can take place. If the printing press has further printing units 4 behind the printing unit 4", wherein the film transfer takes place, further images can be set on the sheet 5 accordingly.

Furthermore, it is also possible that, after the turning, the printing material 5 first of all has images set on it, then is coated with transfer film and subsequently is printed again. The limits for these different sequences of coating and printing are restricted only by the number of processing stations or printing units 4 of the printing press 2. At least each potential transfer nip 16, whether it is in front of or behind a further printing unit 4 or in front of or behind a turning cylinder 24, can also actually be used as transfer nip 16 as a result of the web guiding elements 19, 20, 21.

FIGS. 3A to 3D diagrammatically show different guidance for the transfer film web 3. Here, the film module 17 can be provided at different positions on or else next to the printing press 2. The positions for the film transfer can also be provided at different positions/printing units 4 of the printing press 2. Here, the number of printing units 4 is to be understood only symbolically and is adapted to the space for the drawing. In principle, more or else fewer printing units 4 or else varnishing units can be provided.

Figure 3A:
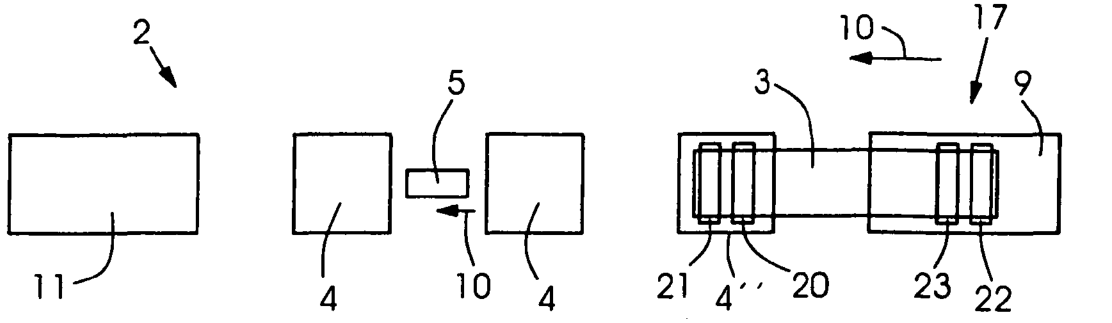
FIGS. 3A-3D are schematic views showing different variants of the transfer film guiding system in different positions of a film module.

FIG. 3A shows one exemplary embodiment, wherein the film module 17 is provided on the feeder 9 of the printing press 2. Here, the film module 17 also comprises a transfer film collecting roller 23. Here, only the deflection rollers 20, 21 which make guidance of the transfer film 3 possible to the transfer nip 16 out of the horizontal plane and back again are shown as web guiding elements 19, 20, 21. Further web guiding elements 19, 20, 21 can be provided but are not shown here and in the other alternative exemplary embodiments of FIGS. 3*b-d* for the sake of clarity; in particular, in each case only deflection rollers 20, 21 are shown which are used actively in the printing press 2 which has been set up.

In FIG. 3A, the first printing unit 4 is provided directly adjacently to the feeder 9, as a printing unit 4 for the film transfer. This is possible only when an application of adhesive takes place before the film transfer on the sheet 5. As described, this is possible, for example, by an application device on the impression cylinder 14 before the transfer nip 16.

Figure 3B:
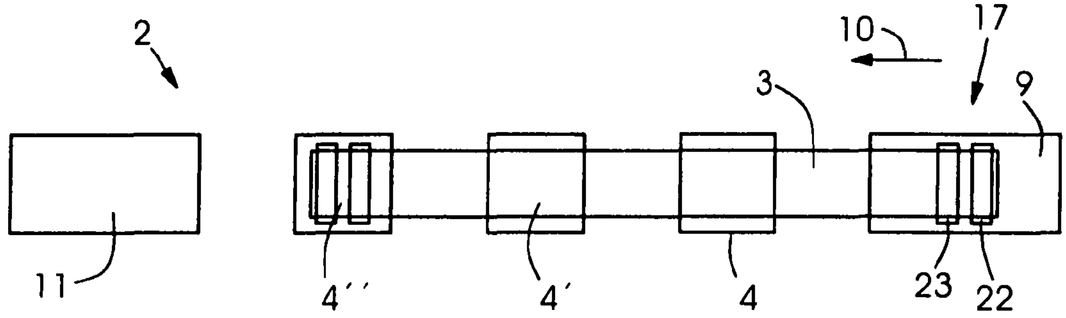

FIG. 3B shows one alternative embodiment with the film module 17 on the feeder 9. The transfer film 3 is guided as has already been described for FIG. 3A.

The deflection rollers 20, 21 which are used here are positioned above the third printing unit 4" after the feeder 9. As described, there are other deflection rollers in the region of the remaining printing units 4, but they are not shown here.

In the embodiment which is shown here, the adhesive can be applied in the second printing unit 4' after the feeder 9.

Figure 3C:
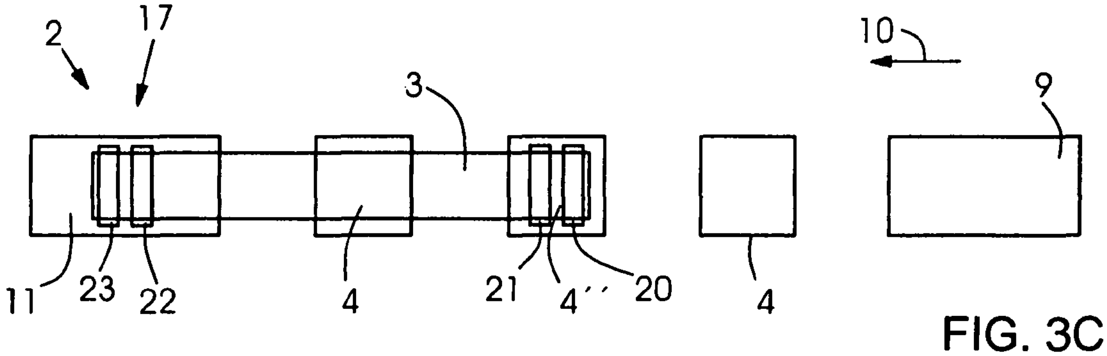

In the embodiment according to FIG. 3C, the film module 17 is situated on the delivery 11. The printing press is set up in such a way that the deflection rollers 20, 21 above the second printing unit 4 guide the transfer film 3 to the transfer nip 16 and back again to the transfer film collecting roller 23.

Here, during the feeding to the transfer nip 16, the transfer film web 3 is guided in the opposite direction to the movement direction of the sheet 5.

Figure 3D:
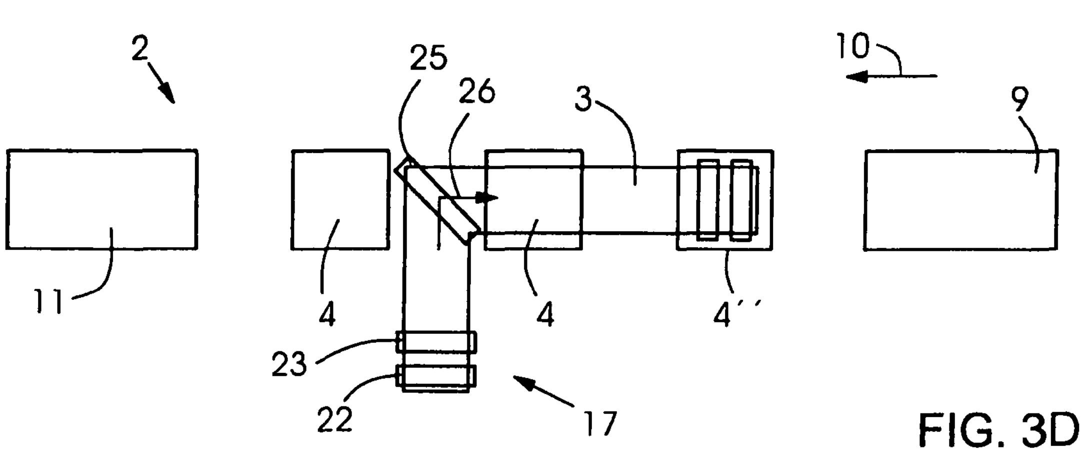

FIG. 3D shows one example for a configuration of the transfer apparatus 1, wherein the film module 17 is not positioned at or on the printing press 2, but rather next to the printing press 2.

The transfer film 3 is first of all transported in a perpendicular direction with respect to the movement direction of the sheets 5. The movement direction 26 of the transfer film 3 is deflected by approximately 90° in the plane by deflection rollers 25, with the result that the transfer film web 3 is then moved parallel to the transport path of the sheets 5. The deflection rollers 25 can be, for ex ample, deflection rollers 25 which are arranged crosswise with respect to one another and at a 45° angle to the film web and make a 90° deflection possible substantially in one plane.

After the deflection, the direction of movement of the transfer film web 3 lies in the opposite direction to the direction of movement of the sheets 5. The transfer film web 3 is fed to further deflection rollers 20 in the region of a printing unit 4" and is then fed again to the film collecting roller 23 of the film module 17, again by corresponding deflection rollers 21, 25.

Figure 4:
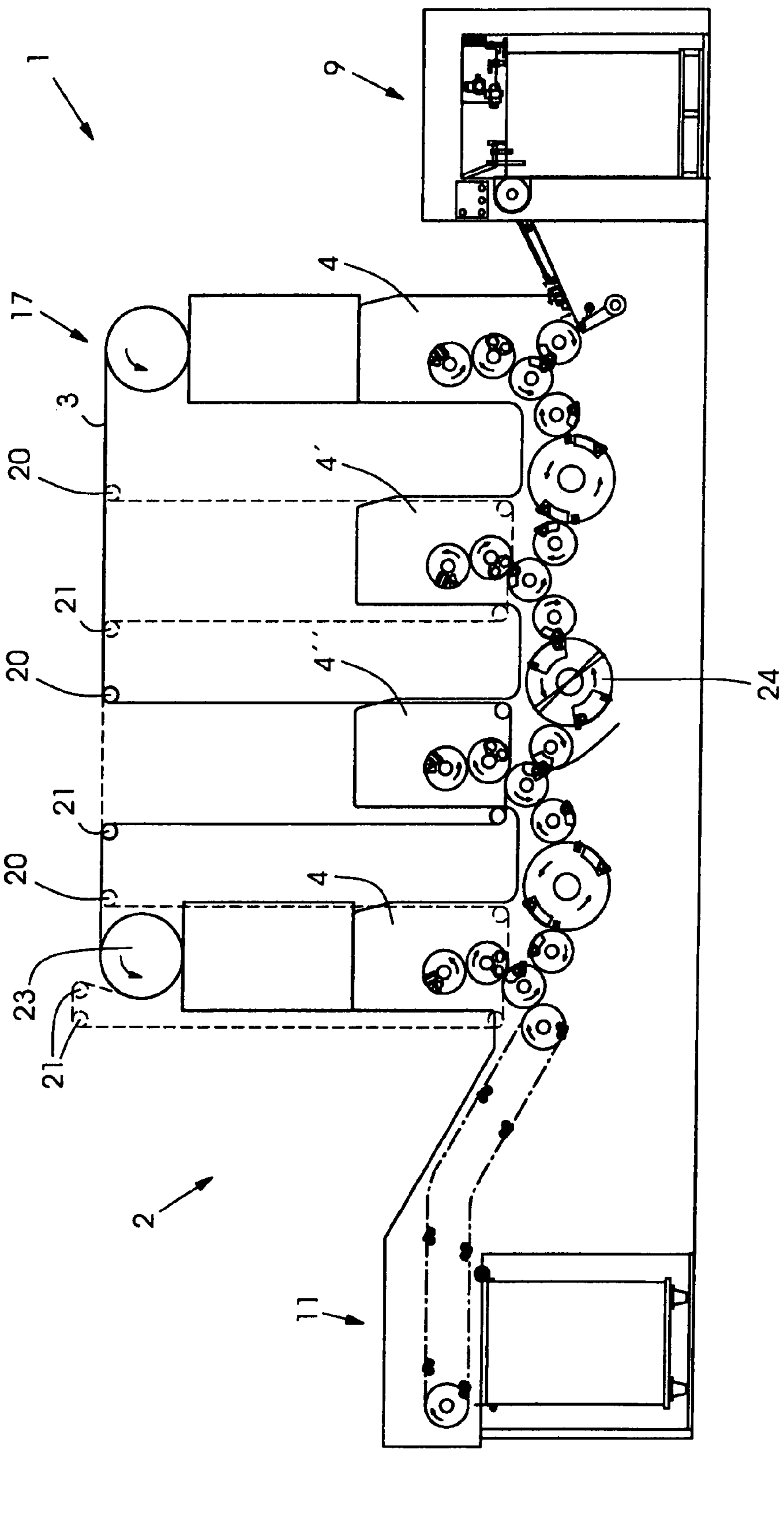
FIG. 4 is a diagrammatic side elevation showing an alternative construction of an apparatus for film transfer having transfer film supply rollers and transfer film collecting rollers which are separated from one another.

FIG. 4 shows one alternative embodiment of the film transfer apparatus 1 having a transfer film collecting roller 23 which is separated spatially from the film module 17. The film module 17 is situated on the first printing unit 4 which is arranged behind the feeder 9, while the transfer film collecting roller 23 is situated on the last printing unit 4 before the delivery 11. The transfer film 3 can be fed via deflection rollers 20 to each printing unit 4 and therefore to each potential transfer nip 16, that is to say the press nips 12. From these potential transfer nips 16 or press nips 12, the transfer film web 3 can be fed to the transfer film collecting roller 23. Tensioning rollers 19 or economy switching devices can also be provided in each case in the region of the film module 17 and/or the transfer film collecting roller 23, but are not shown here.

Setting up of the printing press 2, with the result that a film transfer can take place at each potential transfer nip 16, at least at a selection of different press nips 12, is readily possible by guidance of the transfer film web 3 via the corresponding deflection rollers 20 and 21. In the case which is shown, the printing press 2 is set up in such a way that a film transfer takes place in the third printing unit 4" after the feeder 9. The deflection rollers 20, 21 in the region of the press nips 12 can be provided either within the printing unit housings or outside the housing. They are shown here alternately on the inside and outside by way of example. In the case which is shown here, there is, moreover, a turning cylinder 24 between the film module 17 and the transfer film collecting roller 23.

Figure 5:
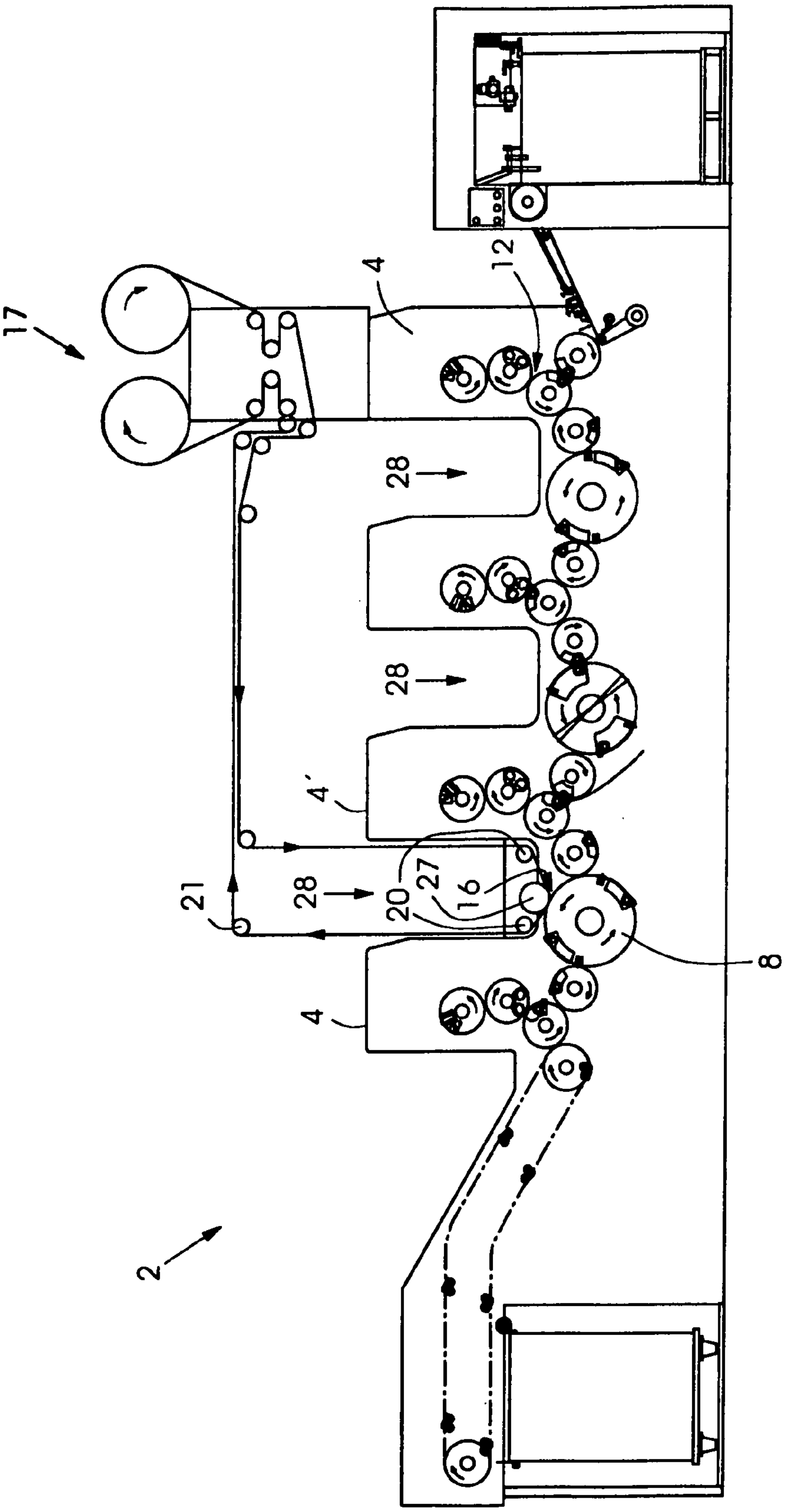
FIG. 5 is a similar view of a further alternative configuration having a plurality of printing presses and film modules in one printing room.

FIG. 5 shows further alternative guidance of the transfer film 3. As described in FIG. 1, the film module 17 is situated on the first printing unit 4 of the printing press 2. Fixed positioning at another location is naturally also possible. As shown in the preceding drawings, the transfer film web 3 can be guided to different press nips 12 via deflection rollers 20, 21. These different guidance possibilities with the corresponding deflection rollers 20, 21 are not shown here for the sake of clarity. Instead, a possible further guiding means to a further potential transfer nip 16 is shown, for which the printing press 2 is shown here in the correspondingly set up state.

The further potential transfer nip 16 can be formed by a sheet transfer cylinder 7 and a further film transfer cylinder 27 which is attached additionally. This film transfer cylinder 27 can be provided within the printing press 2 exclusively for this purpose and, if there is space, can be accommodated directly in an access region 28 of the printing press 2. If there is insufficient space, the film transfer cylinder 27 is accommodated in a widened access region 29, as shown. The transfer film web 3 can be guided to this transfer nip 16 outside the individual adjacent printing units 4' and 4 or (not shown here) can be guided within these printing units 4, 4' around the deflection rollers 20 to the transfer nip 16. Here, the printing unit 4' which is arranged in front is converted in such a way that, as described, it applies an image-providing adhesive onto the sheets 5.

Figure 6:
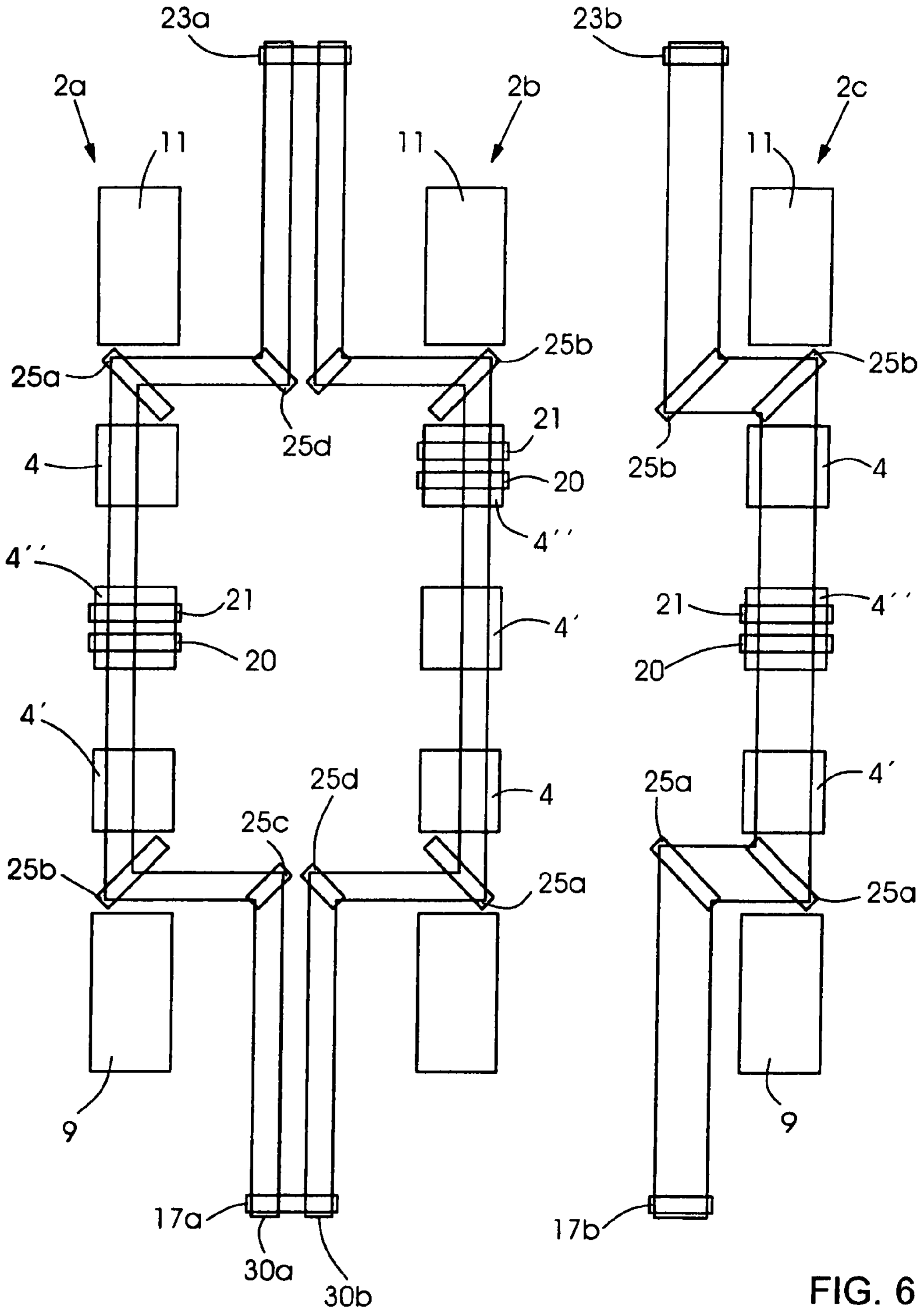
FIG. 6 is a diagrammatic top view of the machine room of a print shop with three presses.

FIG. 6 diagrammatically shows a machine floor of a print shop having three printing presses 2*a*, 2*b* and 2*c*. Each of these printing presses 2*a*, 2*b* and 2*c* can form the described potential transfer nips 16, either by press nips 12, in varnishing units or by a transfer cylinder 27 and a sheet transfer cylinder 7.

Moreover, two film modules 17*a* and 17*b* are situated in the machine room of the print shop, the film module 17*a* unwinding two part film webs 30*a* and 30*b*; these part film webs 30*a*, 30*b* can be made available on two transfer film supply rollers 22 or on a single transfer film supply roller 22. Only one transfer film web 3 is unwound from the film module 17*c* and fed to the printing press 2*c*.

As a result of the variable guidance for transfer film 3, the different webs 3, 30*a*, 30*b* can be fed substantially independently of one another to different printing units 4" or different potential transfer nips 16 of the different printing presses 2*a*, 2*b*, 2*c*.

The film modules 17*a*, 17*b* are positioned in the machine room in the region of the feeders 9 of the printing presses 2*a*, 2*b*, 2*c*. The different transfer film webs 3, 30*a*, 30*b* are guided to the printing presses 2*a*, 2*b* and 2*c* via different deflection rollers 25*a*, 25*b* and 25*c*, 25*d*. Here, the deflection rollers 25*a* and 25*b* have a design size for transfer film webs 3 of normal width and are directed in different directions relative to one another. In contrast, the deflection rollers 25*c* and 25*d* are designed for the narrower part film webs 30*a* and 30*b*; they can be exchanged for deflection rollers 25*a* and 25*b*, in order to make guidance also possible here for transfer film webs 3 of normal width.

The different transfer film webs 3, 30*a*, 30*b* are guided first of all above the printing presses 2*a*-2*c* via the deflection rollers 25*a*-25*d* and are finally fed to transfer film collecting rollers 23*a*, 23*b* in the region of the deliverys 11 of the printing presses 2*a*-2*c*. Above the printing presses 2*a*-2*c*, the transfer film webs 3, 30*a*, 30*b* are guided substantially parallel to the transport path 6 of the printing materials 5 in the printing presses 2*a*-2*c*. The webs 3, 30*a*, 30*b* are then fed via deflection rollers 20, 21 to different printing presses 4", the press nips 12 of which act here as transfer nips 16. In the meantime, the printing units 4' which are arranged in front serve as application units for the adhesive. Further printing units 4 apply ink onto the printing material and/or the transferred transfer layer on the sheet 5. Here, the number of printing units 4 for the printing presses 2*a* to 2*c* is shown as three for the purpose of illustration; usually, a plurality of printing units 4 can be provided, in particular a different number of printing units 4 can be provided for the different printing presses 2*a*-2*c*. Printing ink can then be applied by printing units 4 in front of and/or behind the film transfer. At least one printing unit 4' in front of a transfer nip 16 should be configured as an application unit for the application of adhesive.

The deflection rollers 20, 21 are provided above each potential transfer nip 16, in order to make variable transfer film guidance possible in a simple manner. For reasons of clarity, in each case only those deflection rollers 20, 21 which are set up for the actual guidance are shown here.

Very variable guidance of the transfer film web 3 is made possible by this setting up of a printing press 2 and/or a machine room with different deflection rollers 20, 21 and 25*a* to 25*d*, or else only with parts thereof. For different print jobs, only the corresponding printing press 2 has to be selected and set up, the transfer film is then guided to the desired transfer nip 16 by the web guiding elements which have been selected accordingly. Repositioning of a film module 17 and/or a transfer film collecting roller 23 is no longer necessary. In particular, different film modules 17 can be provided in a machine room, which provide different transfer film types with, for example, different colorations and/or different widths. The webs 3, 30*a*, 30*b* of the different transfer film types 3 can then be guided from these different film modules 17 to the printing presses 2 which are currently required or to their transfer nips 16.

We claim:

1. An apparatus for transferring a transfer layer onto a printing material, the apparatus comprising:

a printing press for printing images on the printing material, wherein the printing material is guided along a printing material transport path through the printing press and through a transfer nip formed between an impression cylinder and a film transfer cylinder;

a film module disposed in a machine room of a print shop containing said printing press and at least one further sheet-processing machine, said film module having at least one transfer film supply roller for storing and unwinding therefrom at least one transfer film web with a carrier film and a transfer layer;

a transfer film guiding device for guiding the transfer film web from the transfer film supply roller to the transfer nip along a film transport path, the transfer nip being configured to transfer the transfer layer onto the printing material as the printing material is guided through the transfer nip along the printing material transport path; and said guiding device including web guiding elements positioned and configured to selectively guide the transfer film web to at least one position in said printing press and at least one position in said at least one further sheet processing machine.

2. The apparatus according to claim 1, wherein said at least one further sheet-processing machine is a printing press disposed in the machine room.

3. The apparatus according to claim 1, wherein the printing press includes a processing station, and said film module is provided on said processing station of said printing press.

4. The apparatus according to claim 3, wherein said processing station is a unit of said printing press selected from the group consisting of a feeder, a delivery, a turning device, a printing unit, a varnishing unit, a punching unit, an embossing unit, or a further processing unit.

5. The apparatus according to claim 1, wherein said web guiding elements comprise deflection elements for deflecting the film web from a first movement plane extending substantially parallel to the printing material transport path towards the transfer nip for transferring the transfer layer onto the printing material.

6. The apparatus according to claim 1, wherein said film module is stationarily mounted in fixed position.

7. The apparatus according to claim 1, wherein said film module comprises a transfer film collecting roller for winding up the transfer film web after having been guided through the transfer nip.

8. The apparatus according to claim 7, wherein said web guiding elements are positioned and configured for guiding the transfer film web from at least two different positions on the printing press to said transfer film collecting roller.

9. The apparatus according to claim 7, wherein said printing press is one of at least two printing presses commonly positioned in a machine room of a print shop, and said guiding elements are disposed in a region of said at least two printing presses and configured for selectively guiding the transfer film web from at least two different positions on said at least two printing presses to said transfer film collecting roller.

10. The apparatus according to claim 1, which comprises at least one transfer film collecting roller disposed in a location different from a position of said film module in a region of said printing press for collecting the transfer film web after having been guided through the transfer nip.

11. The apparatus according to claim 10, wherein said transfer film collecting roller is disposed to follow said film module in the transport direction of the printing material in a printing material transport direction through the printing press.

12. The apparatus according to claim 10, which comprises a turning device of the printing press provided between said film module and said transfer film collecting roller.

13. The apparatus according to claim 10, wherein said web guiding elements are positioned and configured for guiding the transfer film web from at least two different positions on the printing press to said transfer film collecting roller.

14. The apparatus according to claim 10, wherein said printing press is one of at least two printing presses commonly positioned in a machine room of a print shop, and said guiding elements are disposed in a region of said at least two printing presses and configured for selectively guiding the transfer film web from at least two different positions on said at least two printing presses to said transfer film collecting roller.

15. The apparatus according to claim 1, wherein the mutually different positions in the printing press are possible potential transfer nips.

16. The apparatus according to claim 1, wherein the printing material is a sheet-shaped printing material.

17. The apparatus according to claim 1, wherein the printing press is a sheet-fed rotary printing press.

* * * * *